United States Patent [19]

de Macedo et al.

[11] Patent Number: 5,430,236
[45] Date of Patent: Jul. 4, 1995

[54] METHOD FOR VITRIFYING ASH

[75] Inventors: Pedro B. de Macedo, 6100 Highboro Dr., Bethesda, Md. 20817; Hamid Hojaji, Bethesda, Md.; Isabelle S. Muller, Falls Church, Va.

[73] Assignees: Pedro B. de Macedo, Bethesda; Theodore A. Litovitz, Annapolis, both of Md.

[21] Appl. No.: 105,586

[22] Filed: Aug. 13, 1993

[51] Int. Cl.⁶ .............................................. B09B 3/00
[52] U.S. Cl. ..................... 599/252; 405/128; 588/256
[58] Field of Search ............... 588/249, 252, 253, 256; 405/128, 129, 131

[56] References Cited

U.S. PATENT DOCUMENTS

| | | | |
|---|---|---|---|
| 4,687,373 | 8/1987 | Falk et al. | 588/252 X |
| 4,688,495 | 8/1987 | Galloway | 588/252 X |
| 4,998,486 | 3/1991 | Dighe et al. | 588/252 X |
| 5,264,159 | 11/1993 | Ikeda et al. | 588/252 X |

OTHER PUBLICATIONS

State-of-the-Art, Small Scale Medical Waste Incinerator Operating Case History, pp. 355–362.

Primary Examiner—David H. Corbin
Attorney, Agent, or Firm—Jacobson, Price, Holman & Stern

[57] ABSTRACT

By changing the additives to an off-gas system in an incinerator bag house, by replacing part of a normally added calcium compound with a sodium compound, one can reduce the amount of sodium compound needed for a combined off-gas from incineration and glass melting system, reduce the amount of glass produced for a given amount of waste to be incinerated, and thereby reduce the cost of installing a glass melter and the cost of energy (electricity) needed to produce glass.

15 Claims, 1 Drawing Sheet

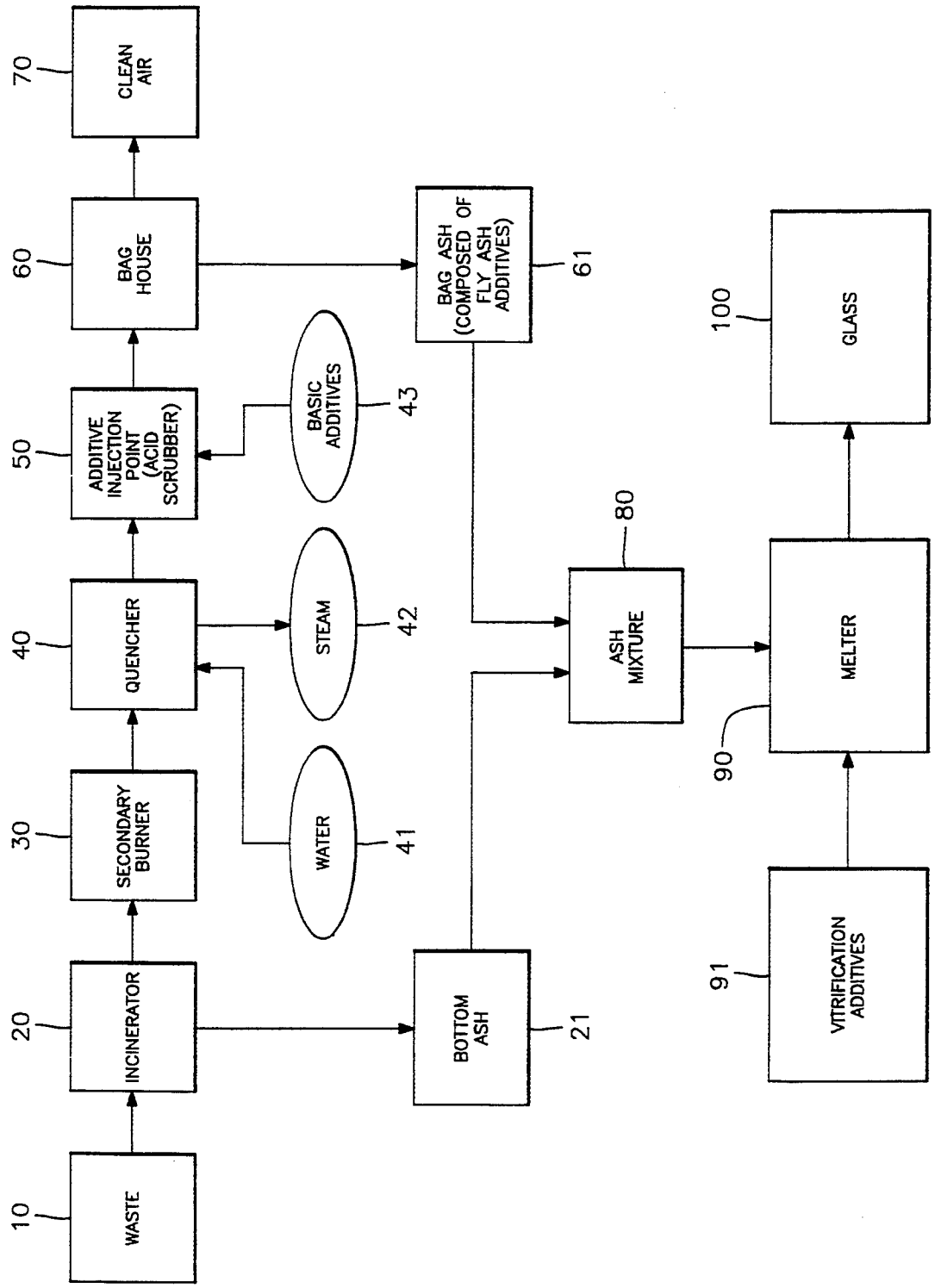

METHOD FOR VITRIFYING ASH

FIELD OF THE INVENTION

This invention relates to the vitrification of ash.

BACKGROUND OF THE INVENTION

The byproducts of waste incineration are bottom ash, which is removed from the bottom of an incinerator, and bag ash. The typical proportion of the two ashes are 1:1 on a weight bases, but may vary depending upon many processing parameters.

A typical formulation for vitrification of these two ashes thus would combine equal quantities of bottom and bag ashes together with sufficient quantities of additives to form a glassy material. The objectives are 1) to use a minimum amount of additives to obtain the largest waste loading, 2) to have maximum volume reduction from waste to ash and to the final glass form, 3) to minimize the processing cost which is related to the vitrifiable volume, and 4) to have a glassy product which would pass the EPA Toxicity Characteristic Leaching Procedure (TCLP) leachability test.

Incinerators for various wastes, including medical waste, control emissions by injecting a calcium component (calcium hydroxide, bicarbonate, etc.) in the off-gas system. The resulting bag ash which includes both flyash and additives such as calcium compounds, is further reacted with the off-gas stream upon calcining 80 to 90% calcium compounds.

Hydrated lime is used to scrub acid gases from incinerator exhaust off gas streams. Hydrochloric acid is the most common form of acidic contaminant found in the off gas streams of hospital waste incinerators, mainly due to the destruction of large quantities of plastics in hospital waste. The byproduct of the scrubbing reaction is calcium chlorides which form a major portion of bag ash residue when removed from incinerator bag house filters.

In a paper published by Morristown Memorial Hospital entitled "State-Of-The-Art, Small-Scale Medical Waste Incinerator Operating Case History", it is indicated that most of the time, ashes, both pcc bottom ashes and bag house ash, are considered hazardous waste since they fail the EPA TCLP leachability test.

SUMMARY OF THE INVENTION

It is an object of the present invention to eliminate the toxicity of the residue ash from incineration by vitrifying the ash.

It is another object of this present invention to minimize the exposure of workers as well as the public at large to the vitrification of ash.

It is further object of the present invention to minimize costs of a combined incineration and vitrification process.

By changing the additives to an off-gas system in an incinerator bag house, by replacing part of a normally added calcium compound with a sodium compound, one can reduce the amount of sodium compound needed for a combined off-gas from incineration and glass melting system, reduce the amount of glass produced for a given amount of waste to be incinerated, and thereby reduce the cost of installing a glass melter and the cost of energy (electricity) needed to produce glass.

This result is achieved because typical incinerator ash is very rich in calcium, resulting in crystallization of calcium silicate and aluminum silicate crystals at the melt temperature. This crystallization can be overcome by additions of sodium, silica and/or boron.

These additives increase the cost by:
1. Their expense (direct)
2. The cost of additional energy (usually electricity)
3. Since more glass has to be produced, the size of the melter must be increased
4. Additional labor, etc.

These problems are overcome by replacing some of the calcium compound additive in the incinerator off-gas system with a sodium compound. In order to compare weights or moles it is advantageous to consider calcium and sodium compounds as their oxide.

In order to overcome the above-noted problems, the single most important parameter is to minimize the amount and cost of additives needed for vitrification of ash into a stable glassy product. In order to have a stable glassy product the following criteria must be met:

1) Glass composition must be thermodynamically stable, meaning that the relative amounts of glass formers, intermediate oxides, and oxide modifiers must satisfy the requirements of forming a stable glass composition.
2) The vitrification temperature should be around 1050° C. to reduce the rate of voltalization of volatile compounds in the mixture and yet have a satisfactory processing rate. Another advantage of this processing temperature range is that durable electrode materials in oxidizing environments such as INCONEL can be used.
3) The glassy produce should in its final form pass the EPA TCLP leachability test. The acidic component of a state of the art medical waste incinerator exhaust stream is scrubbed by using hydrated lime. A typical bottom ash has the following average composition on a dry basis:

| Oxide | wt % |
| --- | --- |
| $Al_2O_3$ | 38.7 |
| $SiO_2$ | 32.4 |
| $Fe_2O_3$ | 5.8 |
| $TiO_2$ | 4.2 |
| CaO | 8.8 |
| MgO | 2.6 |
| BaO | 1.0 |
| $Na_2O$ | 4.7 |
| $K_2O$ | 1.0 |
| others | 0.8 |

The bag ash contains approximately 80% (wt %) unreacted and reacted hydrated lime (the majority being calcium chloride) and about 20% fly ash which has a composition similar to the bottom ash. If it assumed that the moisture content of the lime (total reacted and unreacted) is about 10% and the percent of reacted lime is about 20% in the form of chloride, then the equivalent CaO from 100 parts of the bag ash is about 76 parts while the rest is anhydrous bottom ash. During the vitrification process calcium chloride is transformed into oxide and the majority of chlorine escapes the melter. Based on the above assumptions the average anhydrous bag ash may have the following oxide composition:

| Oxide | wt % |
| --- | --- |
| $Al_2O_3$ | 9 |

-continued

| Oxide | wt % |
| --- | --- |
| $S_iO_2$ | 8 |
| $Fe_2O_3$ | 1 |
| CaO | 80 |
| $Na_2O + K_2O$ | 1 |
| others | 1 |

The total weight loss of the bag ash based on the above assumption upon vitrification and oxidation is therefore about 16%. As a result a 50:50 mixture of received bottom ash and bag ash may have the following combined compositional ranges:

| Oxide | wt % |
| --- | --- |
| $Al_2O_3$ | 15–30 |
| $S_iO_2$ | 15–30 |
| $Fe_2O_3$ | 1–5 |
| $TiO_2$ | 1–5 |
| CaO | 30–45 |
| MgO | 1–5 |
| BaO | 0–3 |
| $Na_2O$ | 1–5 |
| $K_2O$ | 0–3 |
| others | 0–5 |

The variation in composition depends upon the operating conditions of the incinerator, waste materials fed to the incinerator, and off gas scrubbing reagents and filtration conditions. Nevertheless, the percentage of CaO is exceedingly high to vitrify a reasonable glass from the above composition. One way to succeed in doing so is to lower the calcium content by addition of glass formers such as $S_iO_2$ and $B_2O_3$ and flux modifiers such as sodium oxide. $B_2O_3$ is very effective in expanding the glass forming capabilities but is very expensive. On the other hand $S_iO_2$, even though it results in better glass forming capability, it is refractory and requires large amounts of sodium oxide to be added simultaneously. Another drawback of additives as described before is that they lower the final waste loading, thus increasing the volume of glassy product for disposal.

According to the present invention, the calcium content of the mixture of ashes can be lowered without addition of large amounts of additives as required by conventional techniques, thus achieving better economy, higher waste loading, and lower volume of glass product to be disposed of. In most cases, glasses produced by the present invention have higher durability against water than conventionally produced waste glassy products.

In the present invention, part or all of the hydrated calcium oxide used for scrubbing the acidic gases is replaced with hydroxides of alkali metals such as sodium hydroxide. By doing so not only the total calcium content of the final mixture is lowered, but sodium content is naturally increased which facilitates the vitrification process of the mixture of ashes which results in higher waste loading in the final glassy product and use of less expensive additives which would otherwise be required for vitrification.

The following examples demonstrate the utility of the above invention in vitrification of ash on one hand, and minimization of additives required for vitrification on the other.

BRIEF DESCRIPTION OF THE DRAWINGS

FIG. 1 is a schematic flowchart of the process of the present invention.

DETAILED DESCRIPTION OF THE PREFERRED EMBODIMENT

In FIG. 1, waste 10 to be incinerated is fed into incinerator 20. The bottom ash 21 that stays at the bottom of the incinerator 20 is then removed, and the exhaust gases that contain fly ash and acidic components of the incineration gas products and unburned carbon containing particles are passed to secondary burner 30. After secondary burner 30, oxidized carbon containing particles in the exhaust gases enter quencher 40. The hot gases are cooled in quencher 40, by exchanging heat with water 41 through a series of heat exchangers located inside the quencher. The produced hot steam 42, generated from the water heat exchanger can be used to produce electricity in a separate unit. The quenched gases are entered into a scrubber unit 50 that sprays basic additives 43 in the form of hydroxide liquids over the gases, and thus neutralizes the acidic components of the exhaust gases. The combination of gases and hydroxide particulates are filtered in a bag house 60, which separates clean air 70 from solid particulates 61. The solid portion 61 produced in the bag house is composed of fly ash, reacted and unreacted basic additives 43. They are mixed with bottom ash 21 in a mixer 80 and subsequently fed into the vitrification unit 90. Vitrification additives 91 are added to the vitrification unit 90 and their combination forms the final glassy product 100.

EXAMPLE 1

This example describes the vitrification of a mixture of ashes without replacing calcium hydroxide by sodium hydroxide in the scrubbing process.

Formulations of different waste loading with varying amounts and types of additives were synthesized in clay crucibles. The incinerator ash (combined bottom and bag ashes) had the following composition:

| Oxide | Source | wt % |
| --- | --- | --- |
| $Al_2O_3$ | oxide | 21.2 |
| $S_iO_2$ | oxide | 18.80 |
| $Fe_2O_3$ | oxide | 3.2 |
| $TiO_2$ | oxide | 2.6 |
| CaO | carbonate | 46.5 |
| MgO | oxide | 2.3 |
| BaO | oxide | 0.5 |
| $Na_2O$ | carbonate | 3.4 |
| $K_2O$ | carbonate | 0.7 |
| others $LiO_2$, $P_2O5$, Pb 0, ... | carbs., oxides | 0.8 |

This composition falls within the range specified before, which represent 50:50 ratio of bottom ash to hydrated bag ash which is composed of hydrated lime (unreacted and reacted in the equivalent CaO form) and fly ash (with a similar composition to the bottom ash). In all formulations ash materials were synthesized from oxides or carbonates. Formulations made from actual ash produced similar results to the synthesized ones with the exception that real ash, chlorine left the melt at elevated temperatures.

The results are summarized in the following table which in addition to the melt formulation, provides also waste loading and cost of additives per ton of ash. The value of components of formulations are in parts weight.

| formulation No. | combined ash anhydrous oxides | B2O3 added as boric acid | Na2O added as carbonate | SiO2 | liquidus temperature C. | waste loading % (ton of glass) | cost of additives per ton of ash |
|---|---|---|---|---|---|---|---|
| cmm1-29 | 100 | 5 | 30 | 25 | >1100 | 62 | 114 |
| cmm1-28 | 100 | 5.5 | 5 | 11 | >1200 | 82 (1.2) | 49 |
| cmm1-22 | 100 | 28 | 5 | 14 | 1000 | 68 (1.5) | 174 |
| cmm1-33 | 100 | 15 | 0 | 14 | 1060 phase separated | 78 (1.3) | 92 |

Conversion factor from actual hydrous (5% total) and chlorinated (about 5% total) ash to anhydrous oxide ash is 0.9.
Cost of additives:

| | |
|---|---|
| B2O3 | 600 $/ton |
| Na2O | 250 $/ton |
| SiO2 | 80 $/ton |

Conversion factor from anhydrous oxides to as received ash is 1.1.

As a result it is seen that cmm1-28 and 29 operate at high temperatures and cmm 1-22 is expensive to operate. Glass cmm 1-33, even though it has a relatively low liqidus, is heavily phase separated upon cooling below 1060° C., which makes it improbable to pass the TCLP test.

EXAMPLE 2

This example illustrates the use of calcium hydroxide substitution with sodium hydroxide in the scrubber according to the teaching of this invention.

The bag ash would contain 20% fly ash and 80% combination of Ca, and Na hydroxides with 10% moisture content and 20% spent hydroxides as chlorides. We have chosen a Na to Ca ratio in selecting the relative amount of hydroxides to result in the following mass ratio:

$$Na_2O/(Na_2O+CaO)=0.12$$

As a result the sodium content per ton of glass produced is increased by 0.05 ton as sodium oxide and calcium is decreased by the same amount of 0.05 ton as calcium oxide. If we assume a cost of $100/ton of CaO (as derived from hydroxide), then the net cost of replacing calcium with sodium hydroxide is approximately $7 per ton of waste glass produced.

The resulting glass is brownish in color and very homogenous when melted at about 1150° C. for 2 hours in a clay crucible. The liqidus of glass was measured with DTA and is about 1050° C.
100 parts oxide ash mixture
15 $B_2O_3$
14 $SiO_2$
the waste loading of the glass is 78%, and the amount of glass produced is 1.3 tons.

The cost of additives added for the vitrification is:

$92/ton of the ash total cost of additives per ton of ash is $7 (cost of net replacement)+$92=$99/ton of ash

EXAMPLE 3

This example illustrates the use of calcium hydroxide substitution with sodium hydroxide in the scrubber according to the teaching of this invention.

This example illustrates calcium hydroxide substitution but with a higher percentage. We performed a substitution of 50% which resulted in a mass ratio of 0.42. As a result sodium as sodium oxide (derived from hydroxide) had to be increased by 0.15 ton per ton of glass and calcium had to be decreased as CaO by the same amount of 0.15 ton (i.e. derived from hydroxide). The net cost of substitution is about $37/ton of glass produced.

The following mixture was formulated and melted according to the procedure in example 2.
100 parts oxide ash
5.2 $B_2O_3$
10 $SiO_2$ Additionally, about 0.5% of oxides of lead, chromium, and barium were added to the above mixture to determine their leach rates under the standard TCLP leach test. The leaching rates of all the toxic elements of the glass were below the allowable leach rates as summarized in the following table, and clearly the glass passed the TCLP test.

| | Analysis of Leachate After TCLP | | |
|---|---|---|---|
| Sample Name | Cr (ppm) | Ba (ppm) | Pb (ppm) |
| CMM1-30B-WOTC | 0 | 0.6 | 0.5 |
| CMM1-22TC | 0.1 | 6.1 | 1.6 |
| CMMI-30BWTC | 0.4 | 5.7 | 2.1 |
| EPA Limits | 5 | 100 | 5 |

The waste loading of glass is improved to 87%, and the amount of glass produced per ton of ash is 1.15 tons. The costs of additives for vitrification per ton of ash is $35, therefore total cost of additives (without calcium) is $34+$35=$69/ton of ash. The glass has a liqidus temperature of about 1050° C., and is brownish in color.

We claim:
1. A process for vitrifying ash comprising:
producing ash and off gas by incinerating waste,
adding a mixture of sodium and calcium compounds to said off gas from the incinerating step to control acid emissions in said off gas from the incinerating step and to produce an off gas residue, and
vitrifying said ash and said off gas residue with said mixture of sodium and calcium compounds.
2. A process according to claim 1, wherein said mixture of sodium and calcium compounds includes 10% to 90% of a sodium compound.
3. A process according to claim 1, wherein said mixture of sodium and calcium compounds includes at least a 20 to 50% sodium compound.
4. A process according to claim 1, wherein a glass product from said vitrifying step contains hazardous chemicals and has a low leachability rate.

5. A process according to claim 4, wherein the glass product contains radioactivity.

6. A process according to claim 4, wherein the glass product contains radioactive and hazardous chemicals and has a low leachability rate.

7. A process for vitrifying ash comprising:
producing ash and off gas by incinerating waste,
adding a mixture of at least one of oxides, hydroxides and salts of alkali metals and alkaline earth to said off gas from the incinerating step to control acid emissions in said off gas from the incinerating step and to produce an off gas residue, and
vitrifying said ash and said off gas residue with said mixture of at least one of oxides, hydroxides and salts of alkali metals and alkaline earth.

8. A process according to claim 7, wherein said mixture includes at least 10% to 90% of a sodium compound.

9. A process according to claim 7, wherein said mixture includes at least a 20 to 50% sodium compound.

10. A process according to claim 7, wherein a glass product from said vitrifying step contains hazardous chemicals and has a low leachability rate.

11. A process according to claim 10, wherein the glass product contains radioactivity.

12. A process according to claim 10, wherein the glass product contains radioactive and hazardous chemicals and has a low leachability rate.

13. A process according to claim 7, wherein said alkali metal is sodium.

14. A process according to claim 7, wherein said alkaline earth is calcium.

15. A process according to claim 7, wherein said hydroxides are used.

* * * * *